(12) United States Patent
Hewitt et al.

(10) Patent No.: US 6,469,304 B2
(45) Date of Patent: Oct. 22, 2002

(54) PSEUDO-RANDOMIZED INFRARED BLURRING ARRAY

(75) Inventors: Anthony Victor Hewitt; Nicholas Bert Saccketti, both of Tucson, AZ (US)

(73) Assignee: Raytheon Company, Lexington, MA (US)

( * ) Notice: Subject to any disclaimer, the term of this patent is extended or adjusted under 35 U.S.C. 154(b) by 51 days.

(21) Appl. No.: 09/752,493

(22) Filed: Dec. 28, 2000

(65) Prior Publication Data

US 2002/0084418 A1 Jul. 4, 2002

(51) Int. Cl.$^7$ .................................................. G02B 1/00
(52) U.S. Cl. ........................................ 250/347; 250/332
(58) Field of Search ................................. 250/347, 332, 250/350, 351; 359/350, 353, 557, 599

(56) References Cited

U.S. PATENT DOCUMENTS

| | | | |
|---|---|---|---|
| 5,270,859 A | * 12/1993 | Wirth et al. ................. 359/622 |
| 5,701,005 A | * 12/1997 | Meyers ....................... 250/226 |
| 5,867,307 A | 2/1999 | Myers et al. | |
| 5,973,827 A | * 10/1999 | Chipper ....................... 359/356 |
| 6,297,913 B1 | * 10/2001 | Hasenauer et al. ......... 359/691 |

* cited by examiner

Primary Examiner—Constantine Hannaher
Assistant Examiner—Otilia Gabor

(57) ABSTRACT

An infrared blurring array is formed of a substrate having thereon a surface array of blurlets whose foci vary in distance from a nominal focal surface location, and/or whose optical phases at the nominal focal surface location vary, in a pseudorandom but deterministic manner. The substrate may be made of a material transmissive to a waveband of incident infrared energy, and the blurlets are refractive lenslets in the substrate, or the blurlets may be mirrorlets in a reflective substrate. The blurlets are surfaces each defined by a curvature and an axial offset from a nominal focal surface location. At least one, and preferably both, of the curvature and the axial offset of each blurlet is a value that is randomly selected from a set of values defined by a respective distribution, preferably a truncated distribution.

20 Claims, 6 Drawing Sheets

FIG. 8

| Rc | 1 | 2 | 3 | 4 | 5 | 6 | 7 | 8 | 9 |
|---|---|---|---|---|---|---|---|---|---|
| 1 | 11865.23 | 16204.56 | 8346.033 | 25831.41 | 17719.6 | 27146.97 | 20622.05 | 24220.86 | 20233.07 |
| 2 | 7310.971 | 23787.51 | 11777.9 | 13651.62 | 13641.87 | 21877.92 | 6639.039 | 6791.505 | 6658.344 |
| 3 | 11312.98 | 11634.15 | 14494.87 | 9912.805 | 15950.73 | 20557.4 | 25545.18 | 14988.09 | 7256.44 |
| 4 | 8097.571 | 19991.51 | 8319.545 | 18655.33 | 16782.18 | 11518.53 | 19222.37 | 22768.11 | 28356.76 |
| 5 | 9793.257 | 6289.428 | 6162.834 | 20409.34 | 10152.66 | 14029.06 | 9705.567 | 26259.7 | 27825.16 |
| 6 | 14610.25 | 11819.02 | 12485.37 | 16576.67 | 18380.83 | 12016.28 | 10580.36 | 27462.37 | 25212.01 |

FIG. 9

| S | 1 | 2 | 3 | 4 | 5 | 6 | 7 | 8 | 9 |
|---|---|---|---|---|---|---|---|---|---|
| 1 | 0.30609 | 2.7449 | 0.917 | 2.8015 | -1.7002 | 1.7223 | -0.98495 | -2.3174 | -2.5268 |
| 2 | -1.3553 | -1.4711 | 0.579985 | 2.039 | -0.41552 | -0.64846 | -0.53592 | 1.0722 | 2.3205 |
| 3 | -0.042695 | -0.1328 | 0.055923 | 0.96914 | -1.8498 | 1.5889 | 0.12905 | -0.02495 | -1.1475 |
| 4 | 2.6752 | -0.42788 | -2.7619 | -.14635 | 0.84012 | -2.773 | -0.92981 | 0.33128 | 0.99193 |
| 5 | -2.6959 | 0.12709 | 2.1943 | 1.886 | .16865 | -0.98173 | -2.9689 | -2.6862 | 0.70711 |

PSEUDO-RANDOMIZED INFRARED BLURRING ARRAY

This invention was made with government support under contract No. N00019-97-C-0027 awarded by Naval Air Systems Command. The government has certain rights in this invention.

This invention relates to optical systems, and, more particularly, to a blurring array that defocuses the optical beam in a controlled manner and avoids interference effects in the defocused beam.

BACKGROUND OF THE INVENTION

In one common configuration, an imaging infrared (IR) optical sensor (i.e., a focal plane array or FPA detector) consists of a large number, typically thousands or tens of thousands, of individual electro-optic detector elements, which are positioned at the focal plane of the optical system. The detector elements view a scene through an appropriate optical path and produce an electrical output responsive to the scene. The materials and/or construction of the detector elements may be selected to be sensitive to different wavelength ranges (wavebands) of electromagnetic radiation, including, for example, infrared energy. The detector elements are arranged in a planar array, with each detector element providing one pixel of an image. The outputs of the detector elements are digitally processed to form an electronic re-creation of the image which may be further analyzed.

Ideally, all of the detector elements would respond identically to incident energy, with the signal output of each detector element identically proportional to the incident energy. In practice within the limitations of current technology, however, each of the different detector elements may be expected to respond slightly differently. Changes in the pixel responses may also develop in the detector array with time, cooling variation, or use. These differences may be evident as gain or zero-point offsets, nonlinearity, or other types of departures from the ideal identical response. As a result of such departures, if a perfectly uniform infrared input scene were presented to the FPA detector, the detector output would not be perfectly uniform.

A variety of techniques are known for both reducing the departure from the ideal in the mass-produced detector elements during production, and also for compensating for non-ideal responses which develop during service. Calibration and real-time service techniques have been developed to compensate for the nonuniformities in the detector elements. Some of these techniques require a controllable blurring of the image, such that during some periods an unblurred image is viewed by the detector and during other periods a blurred image is viewed by the detector. Effective system performance requires the blurred image to be free of significant structure due to scene features that are insufficiently smoothed or artifacts created by interference effects. A substantial reduction in mean incident energy reaching the detector also has an adverse effect, so the blurring must not be so great as to divert significant energy outside the sensitive region of the detector, and large-angle scatter must be controlled.

The controlled blurring of the scene presents a challenge, and a variety of techniques have been used. For example, with one known approach, the scene is viewed by the detector array through two optically transparent elements of different optical path lengths (thickness and/or refractive index). One element is selected such that the image is focused onto the focal plane of the detector array, and the other element is selected such that the focus is longitudinally displaced from the focal plane of the detector array. While operable, in practice it has been found for infrared sensors that the blurring is insufficient, and that relatively high spatial frequency features of the scene may still be discerned.

Another approach, described in U.S. Pat. No. 5,867,307, improves upon the prior techniques and provides adequate blurring performance in many applications. However, there are some situations where interference effects are present in the blurred image, or there may be too much blurring, resulting in an unacceptable loss of scene energy.

Accordingly, there is a need for an improved approach to intentional and controlled image blurring for infrared detectors, particularly in systems with restrictive space constraints such as infrared missile seekers. The present invention fulfills this need, and further provides related advantages.

SUMMARY OF THE INVENTION

The present approach provides an optical system with a blurring array. The controlled blurring approach is applicable to optical systems of a wide range of wavelengths but is of particular interest for infrared systems. The blurring array provides a controllable degree of blurring. Additionally, it avoids interference effects in the blurred image that may lead to false images being detected by the detector. The result is that the input image of the scene may be controllably blurred for both calibration and service requirements. The blurring array is designed for compatibility with available manufacturing techniques.

In accordance with the invention, an optical system comprises a blurring array comprising a substrate having a surface array of blurlets whose optical foci vary from a nominal focal surface location and/or whose optical phase at the nominal focal surface location varies in a pseudorandom but deterministic manner. The blurlet is an optical element that introduces a controlled blurring into an image. The blurlet may be a lenslet in a substrate material transmissive to a waveband of incident infrared energy, such as silicon for the mid-wavelength infrared range of about 3–5 micrometers wavelength. The blurlet may instead be a mirrorlet that reflects optical energy. In one application, the infrared system further includes a detector lying at about the nominal focal surface location, and an optics system that focuses infrared energy from a scene onto the detector.

An array of identical or nearly identical blurlets would focus the incident beam to a blurlet focal plane slightly different from that of the detector. There would be blurring, but the inventors have found that interference effects typically result from such a regular array of blurlets. The present approach varies the foci and/or phase of the energy passing through the individual blurlets in a pseudorandom fashion. That is, there is a random variation within constraints imposed in the design process.

In a typical case, the foci of the blurlets and/or their axial offsets are at locations relative to the nominal focal surface location that are randomly selected from a set of values defined by a distribution, more preferably a truncated distribution that prevents too wide a spread in the values. For example, the distribution may be truncated at +/− one standard deviation (or other fixed value) on either side of the mean, which prevents too great a blurring of the image. A variety of distributions, such as normal, flat, and other distributions may be used. A normal distribution was convenient for use in the preferred embodiments, but the practice of the invention is not so limited. The blurlets may be surfaces each defined by a curvature and an axial offset from the nominal focal surface location, wherein at least one of the curvature and the axial offset of each blurlet is a value that is randomly selected from a set of values defined by a respective distribution or respective truncated distribution.

The present invention thus provides a blurring array that achieves a controllable amount of blurring and also avoids interference effects in the blurred image, without excessively reducing the scene energy that reaches the detector. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 8 is a table of a portion of the radius matrix of a selected set of values of the radius of curvature $R_c$ of the blurlets for one application;

FIG. 9 is a table of a portion of the offset matrix of a selected set of values of the axial offset β of the blurlets for the same application as FIG. 8.

DETAILED DESCRIPTION OF THE INVENTION

Figure 1:
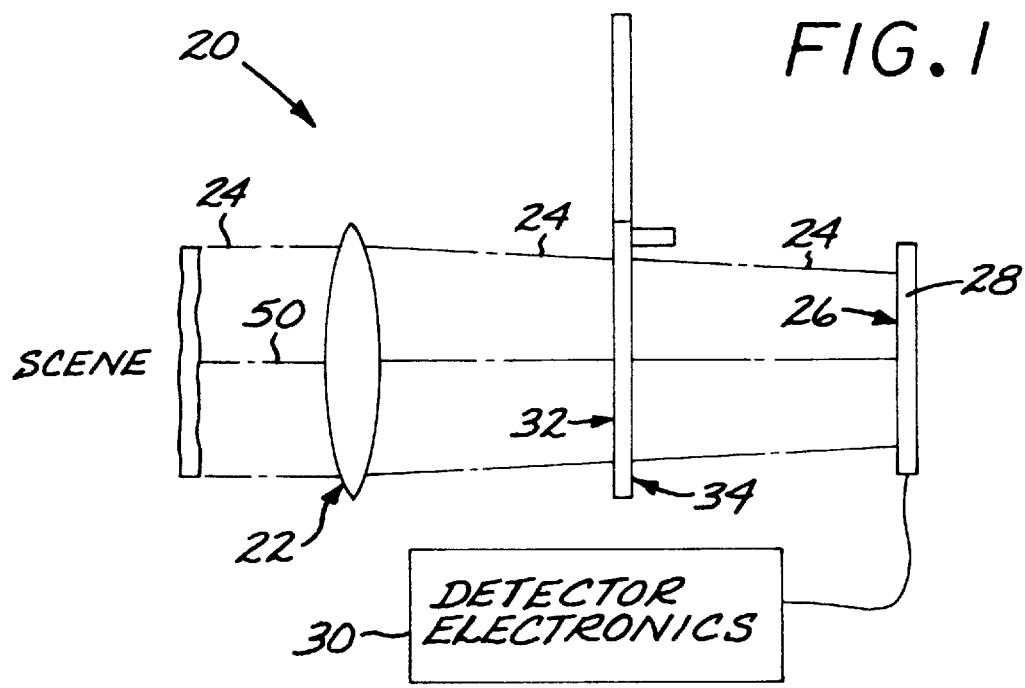
FIG. 1 is a schematic depiction of an infrared sensor system.

FIG. 1 is a depiction of a preferred infrared sensor optical system 20 that views a scene and produces an electronic representation of that scene. (The discussion is applicable to sensor systems operating at other wavelengths as well.) The infrared sensor optical system 20 includes an optics system 22, here schematically represented as a single lens but which usually includes a number of lenses and/or mirrors and possibly other optical components. The optics system 22 focuses focusing beams 24 from the scene to a nominal focal surface location 26 of an infrared detector 28, such as a focal plane array. (The nominal focal surface location 26 is nominally the focal plane of the detector 28, but the focal plane of the blurring array discussed subsequently varies slightly from this nominal focal plane.) The detector 28 converts the incident focusing beams 24 into an electrical signal for processing by detector electronics 30. Detectors 28 operable with various waveband ranges of infrared energy and detector electronics 30 are known in the art.

Figure 2:
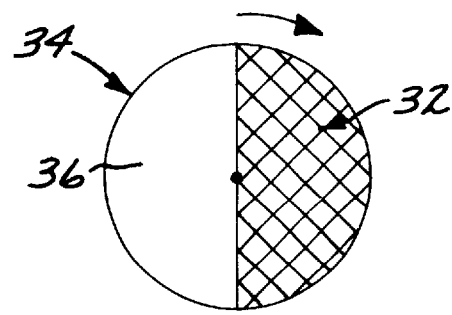
FIG. 2 is an elevational view of a blurring array occupying one-half of a circular wheel.

The focusing beams 24 pass through (or are reflected by) a blurring array 32 prior to reaching the detector 28. In one application of particular interest illustrated in FIG. 2, the blurring array 32 is supported on a rotating wheel 34. The blurring array 32 occupies a segment of the rotating wheel 34, here 180 degrees of its circumference. The remainder of the rotating wheel 34 is an unblurred portion 36. The rotation of the wheel 34 through the focusing beam 24 produces an alternating pattern of blurred and unblurred images on the detector 28. The resulting electrical signals may be processed by the detector electronics 30 to gain information on the nature of the scene that may not be obtained otherwise. This signal processing is known in the art and is not within the scope of the present invention, which is concerned with the structure of the blurring array 32 and other physical elements of the infrared system.

Figure 3:
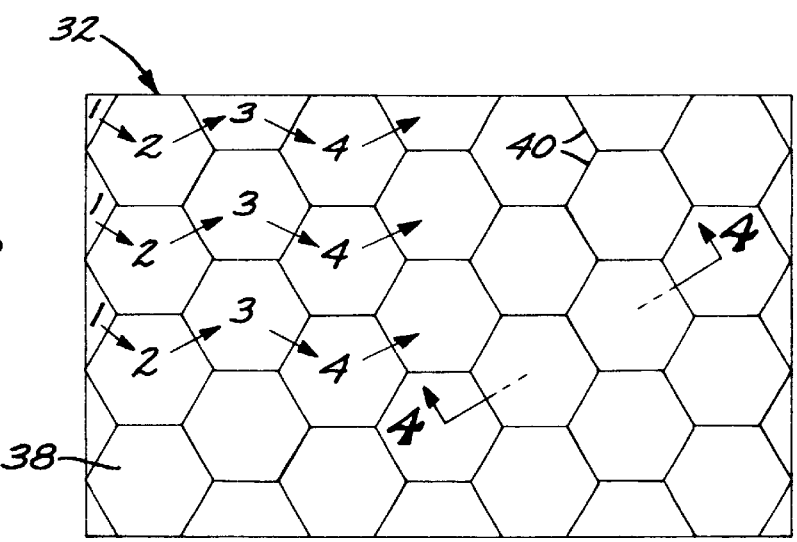
FIG. 3 is a plan view of a portion of the blurring array.

FIG. 3 is a plan view of a portion of the blurring array 32. The blurring array 32 is made of a plurality of blurlets 38, preferably packed together in a close-packed form. The blurlet 38 is an optical element that introduces a controlled blurring into an image. The blurlets 38 may be either transparent refractive elements, termed "lenslets", or reflective elements, termed "mirrorlets". The refractive lenslets must be made in a material transmissive to the wavebands of interest, while the reflective mirrorlets need not be formed in a transmissive material. The applications involving lenslets are currently most preferred and are discussed in detail in relation to FIGS. 1–5, and mirrorlets are discussed in relation to FIG. 10.

The preferred arrangement of the blurlets 38 is a hexagonal-close-packed array as illustrated in FIG. 3, but other close-packed array such as square array or a triangular array may be used instead. The blurlets may be arranged other than in a close-packed array, but such arrangements are optically less efficient. The individual cells 40 of the blurring array 32 of FIG. 3 are numbered for subsequent reference.

Figure 4:
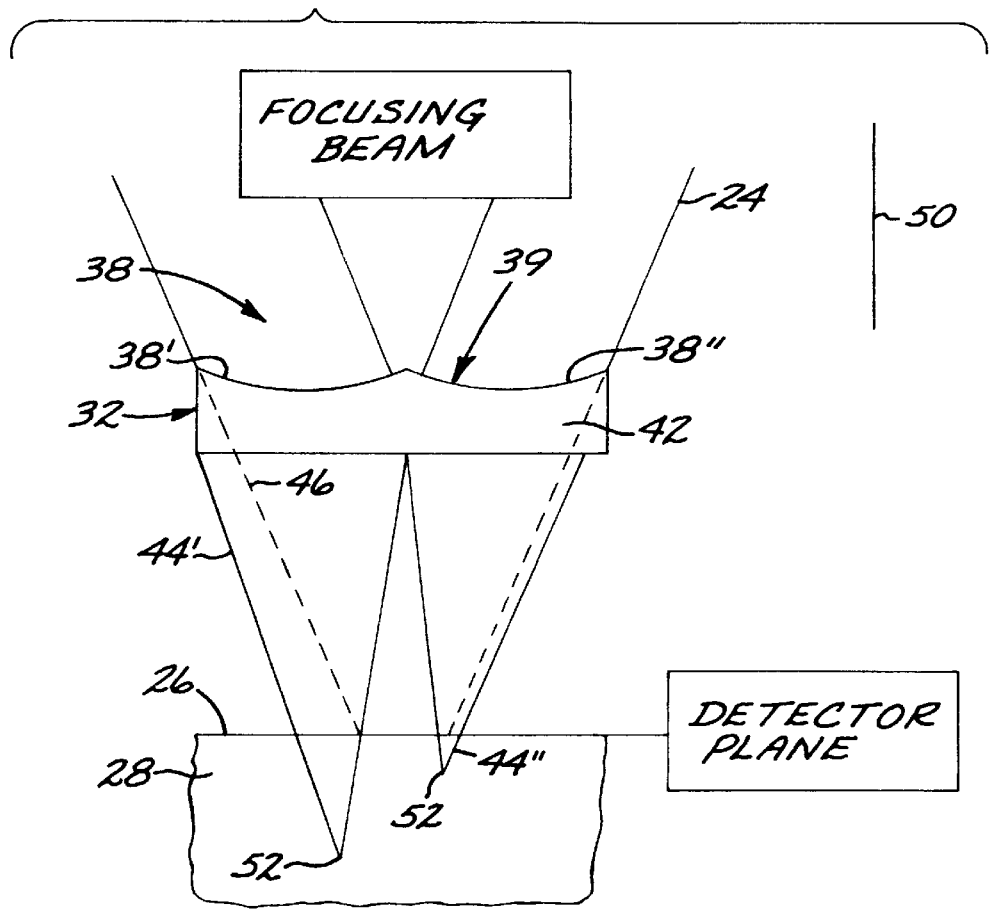
FIG. 4 is a schematic sectional view of two lenslets of the refractive blurring array, taken on line 4—4 of FIG. 3.

As seen in FIG. 4, the blurring array 32 using refractive lenslets 39 comprises a substrate 42 made of a material transmissive to a waveband of the incident infrared energy rays. Such transparent materials 42 are known in the art for various infrared wavebands. For the mid-infrared waveband of about 3–5 micrometers, the preferred material of construction of the substrate 42 is silicon. Other materials may also be used, such as germanium for the 8–12 micron long in-frared waveband, fused silica for the 1–3 micrometer near-infrared waveband, or plastic for the visible waveband.

The substrate 42 has the surface array of blurlets 38 thereon, and two such blurlets 38' and 38" are shown in FIG. 4. The blurlets 38 in the form of refractive lenslets 39 are individual small-sized lenses which are made controllably different from each other in the manner to be discussed subsequently. In general, the foci of the blurlets 38 vary from a nominal focal surface location 26 in a pseudorandom but deterministic manner, and/or the optical phases of the. focusing beam 24 vary at the nominal focal surface location 26, as schematically indicated by solid lines 44' and 44". For reference, the dashed line 46 shows the focusing of the focusing beam 24 in the absence of the blurring assembly 32 (that is, when the unblurred portion 36 of the rotating wheel 34 is between the scene and the detector 28).

Figure 5:
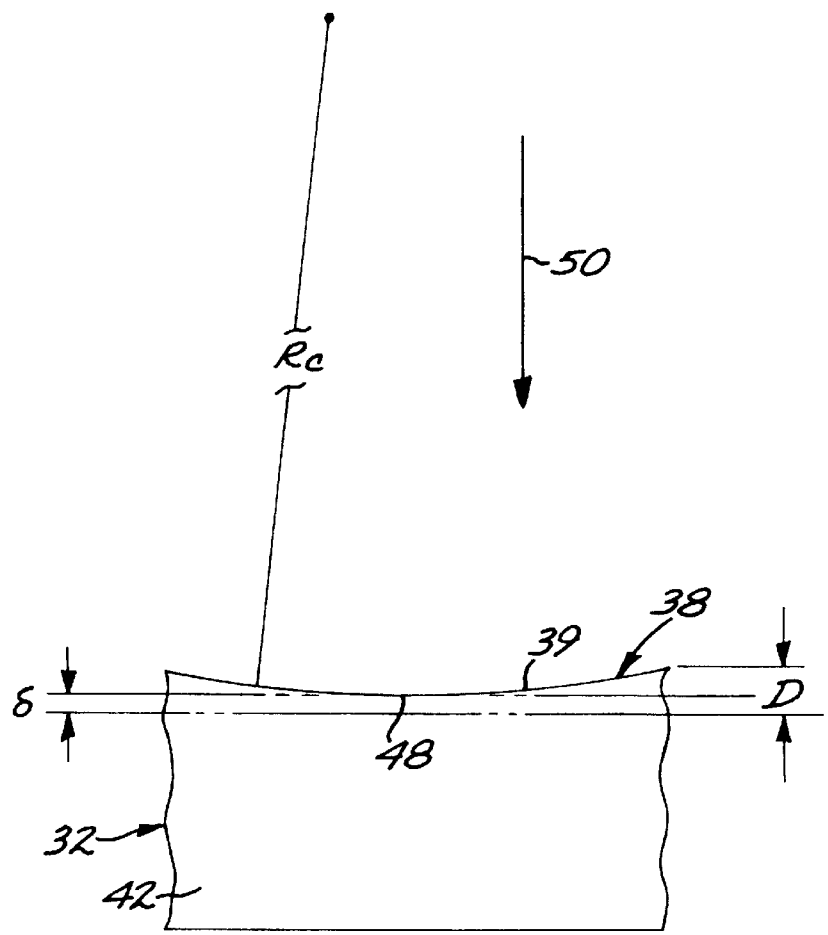
FIG. 5 is an enlarged schematic view of a single lenslet depicting the definitions of the radius of curvature and the offset.
Figure 5:
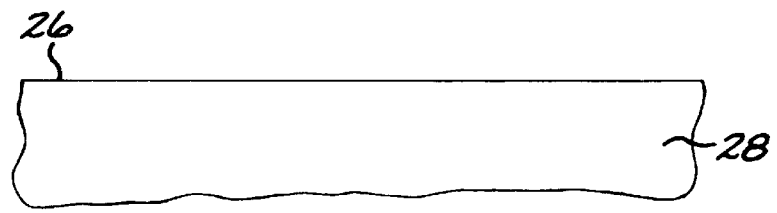

FIG. 5 illustrates the geometry and associated nomenclature used for the blurlet 38 in greater detail. The illustrated blurlet 38 is concavely curved relative to the substrate 42 with a radius of curvature $R_c$ in the case of the preferred spherically curved blurlet 38. The blurlet 38 may be more complexly curved with an aspheric (e.g., parabolic) curvature. The blurlets 38 of the array may also be convexly curved, or there may be both convexly and concavely curved blurlets in a single array.

An apex 48 is that portion of the surface of the lenslet 39 that is closest to the nominal focal surface location 26 of the detector 28. The location of the apex 48 may be described as a mean distance D from the surface of the initial substrate 42 (prior to any machining or forming of the blurlets), plus an axial offset 6 (measured generally parallel to an axial direction 50 between the scene and the detector 28). This nomenclature is used because the values of δ of the array of blurlets 38 are described statistically by their individual variation about the mean D.

Figure 6:
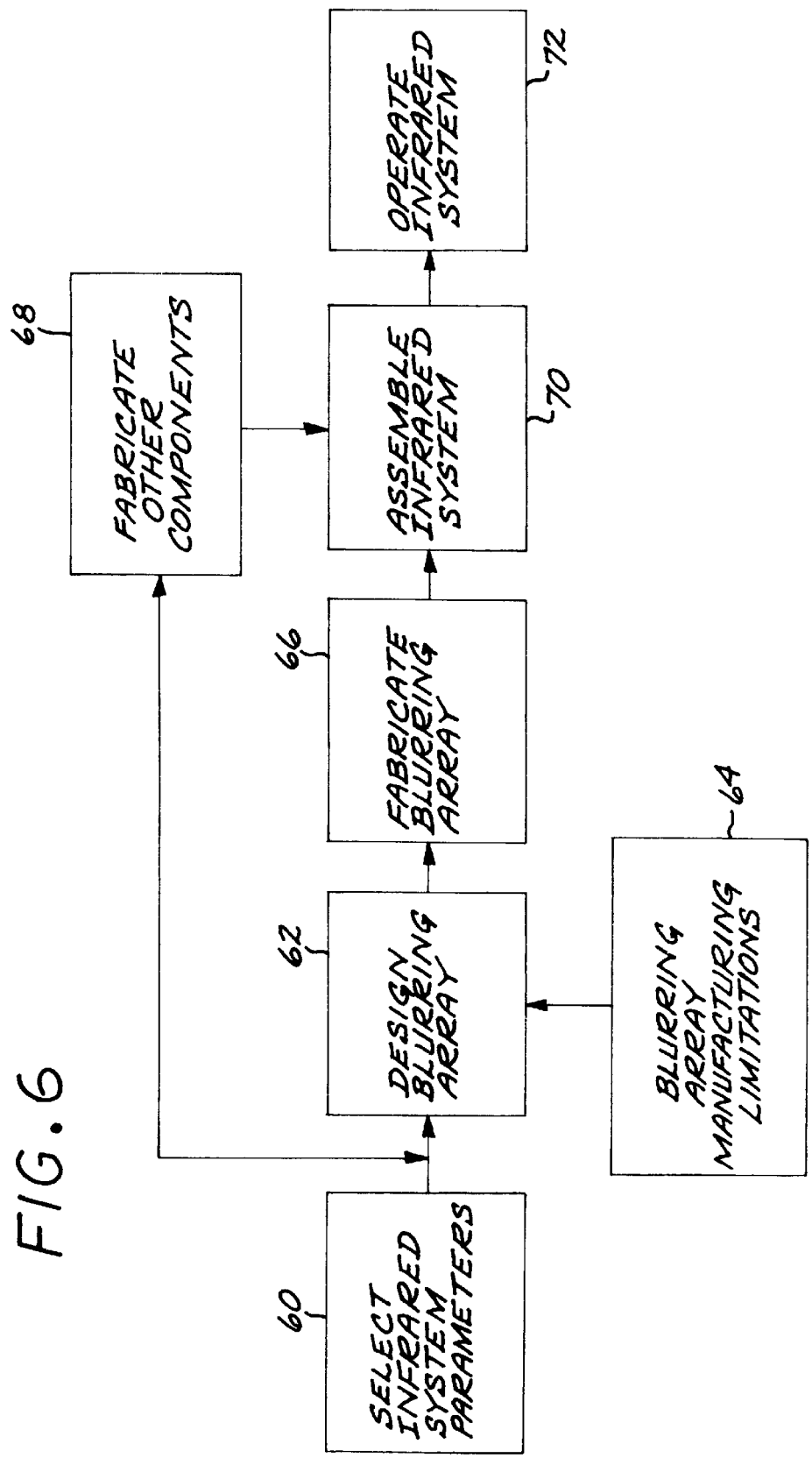
FIG. 6 is a block diagram of an approach for designing and manufacturing the blurring array.

FIG. 6 depicts a preferred approach to the fabrication and use of the infrared system 20. A set of required infrared system parameters is selected, numeral 60. This set of system parameters is used, together with the manufacturing limitations 64 on the fabrication of the blurring array 32, to design the blurring array, numeral 62. The blurring array 32 is fabricated to the resulting design parameters, numeral 66. The system parameters from step 60 are also used to fabricate the other components of the infrared system 20, numeral 68, such as the optics system 22 and the infrared detector 28. The other components and the blurring array 32 are assembled together to make the infrared system 20, numeral 70, and the infrared system 20 is operated, numeral 72.

Figure 7:
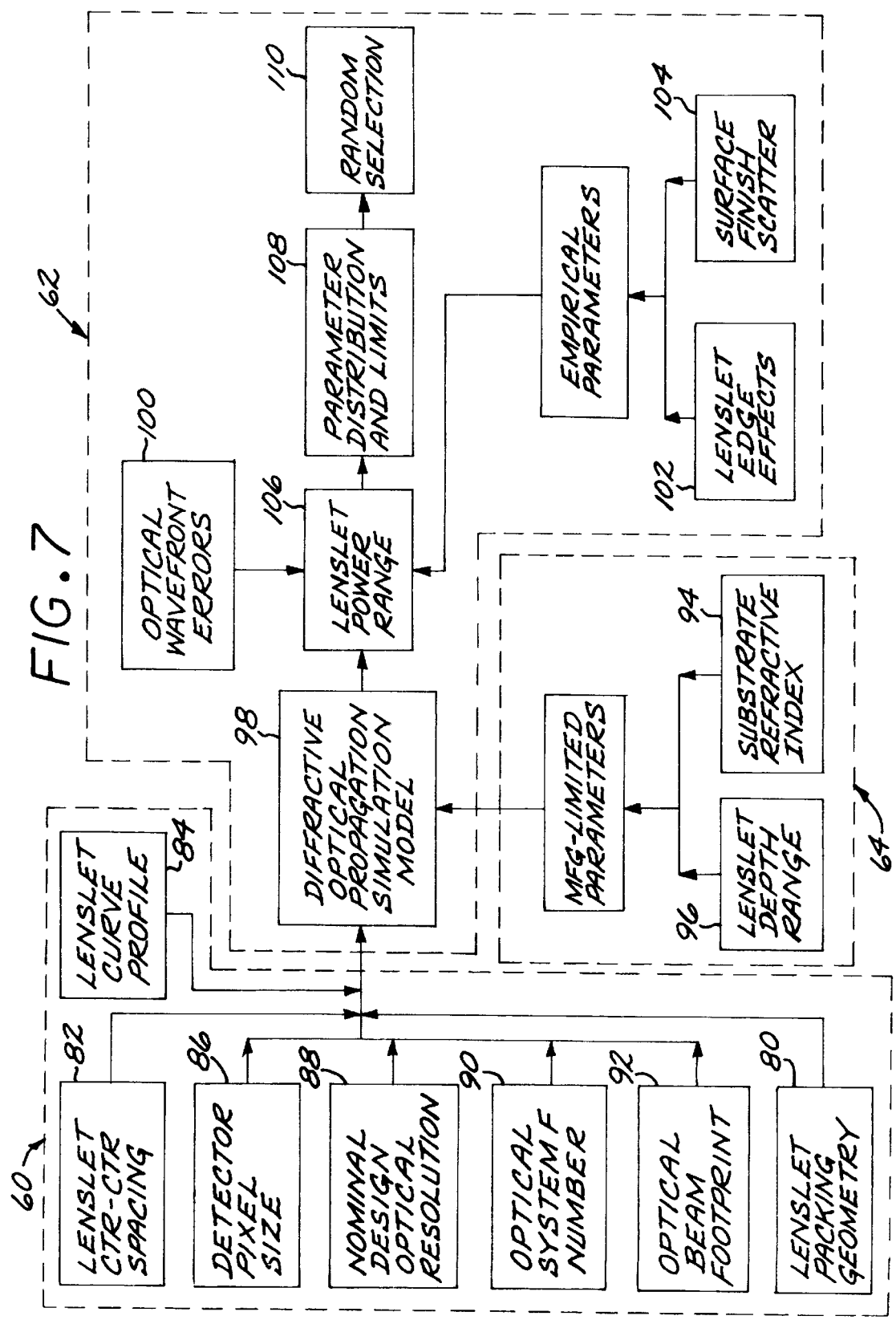
FIG. 7 is a block diagram of a detailed approach for designing the blurring array.

FIG. 7 illustrates the preferred form of the design process of steps 60, 62, and 64, for designing the blurring array 32, of FIG. 6 in greater detail. In general, the design approach implements the important feature of the present invention that at least one (and preferably both) of the foci 52 (and thence the radii of curvature $R_c$) of the blurlets 38 and the axial offsets δ vary in a pseudorandom but deterministic manner. The axial location (that is, measured parallel to the direction 50) of the foci. 52 (and thence the radii of curvature $R_c$) of the various blurlets 38 may not be the same, and/or the axial offsets δ of the various blurlets 38 may not be the same. Preferably, both the axial locations of the various foci 52 (and thence the radii of curvature $R_c$) of the various blurlets 38 are not be the same, and the axial offsets 6 of the various blurlets 38 are not the same.

The variations of the axial locations of the foci 52, the radii of curvature $R_C$, and the axial offsets 8 do not have random values selected from an infinite range. If they were random over too large a range, then some of the values would be too large or too small for effective blurring. That is, if the blurring is too small, features from the scene may be apparent in the image of the detector 28, and the value of the blurring array 32 is lost. If the blurring is too large, the. scene irradiance on the detector array differs excessively from the blurred to the unblurred frames, and uniformity correction of the array is not effective because it depends upon each pixel signal level. The excessive blurring causes reduced scene irradiance (intensity).

The values of the axial locations of the foci 52, the radii of curvature $R_c$, and the axial offsets δ are therefore determined in a pseudorandom manner, in which random values are selected from a defined statistical variation of the parameters that is consistent with the optical design of the system, and not just as random numbers from an infinite range. In the preferred approach, a statistical distribution in each parameter is defined, preferably in the form of a truncated distribution to ensure that the values will not be excessively small or excessively large. Then random values of the parameters are selected. from within this distribution. This design process is thus a pseudorandom, deterministic procedure for obtaining the values, and thus differs from a random distribution of the values.

The relevant infrared system parameters 60 include the parameters for the blurlets: a blurlet packing geometry (e.g., hexagonal close packed is preferred), numeral 80; a blurlet center-to-center spacing (the distance between the centers of the cells 40 of the blurring array 32), numeral 82; and the blurlet curve profile (i.e., single spherical curvature as preferred, or a spherically curved as in a parabolic curvature), numeral 84. The blurlet packing geometry is selected for efficiency and maximum light transmission, with the hexagonal-close-packed structure preferred. The blurlet center-to-center spacing is selected according to the beam diameter, the detector pixel size, and the desired blur diameter for a point source. Practically, the maximum center-to-center spacing is determined by the need to have at least about 50 or more blurlets intercepted by the beam to get good statistical blurring. The minimum center-to-center spacing is determined by manufacturing considerations, inasmuch as a blurlet spacing of less than about a wavelength of the light is difficult to manufacture reproducibly. The blurlet curvature profile is selected to tailor the individual blurlet power and focused spot uniformity and for manufacturability, and the spherical surface is preferred.

The more general optical parameters are selected according to the availability of hardware components and the optical requirements of the system. These include the pixel size of the detector 28, numeral 86; the nominal design optical resolution, numeral 88; the optical system F-number, numeral 90; and the optical beam footprint (size of the beam on the detector array for a point source), numeral 92.

Manufacturing limitations on the fabrication of the blurring array 32, numeral 64, are provided. The manufacturing of the blurring array requires the formation of precisely defined blurlets in the surface of the substrate 42. The available manufacturing processes impose geometrical limitations on what actually may be fabricated. A virtue of the present approach is that these manufacturing limitations are taken into account in the design process, to ensure that the blurring array 32 which is designed may actually be manufactured. The manufacturing limitations also include the refractive index of the available materials that meet the requirement that they are infrared transmissive in the waveband of interest, numeral 94. The manufacturing limitations also include the maximum size and depth of the surfaces of the blurlets 38 that may be fabricated by the selected machining procedure, numeral 96. The preferred approach is reactive ion etching of the blurlets 38.

The infrared system parameters 60 and the manufacturing limitations 64 are provided to the design step 62. In the design step 62, an optical propagation simulation model is initially employed, numeral 98. Operable models include the Advanced Systems Analysis Package available from Breault Research Organization, Tucson, Arizona, and the Code V Optical Design Package available from Optical Research Associates. Any other operable optical models may be used which include diffractive behavior. In general, these optical propagation simulation models calculate the paths of the rays/wavefronts from the scene, through the optics system 22 and various options for the blurring array 32 with the input parameters 60 and 62, to produce a simulation of the blurring at the detector 28.

The available optical propagation simulation models were not sufficient to take all effects into account mathematically. The results of the simulation were therefore empirically adjusted using considerations of particular optical wavefront errors, numeral 100, and empirical parameters including blurlet edge scattering effects, numeral 102 and surface finish scatter effects, numeral 104. The result was a determination of the blurlet power range, numeral 106. From this range. information, the distribution and limits of the other controllable parameters were established, numeral 108. Random selections were made from these parameters using standard random selection procedures, numeral 110. To aid in this empirical process, prototypes were built based on the predictions of: the simulations and tested. These prototypes had a range of center-to-center spacings, depths, and radii of the blurlets. The calculated blurs and uniformity were balanced with the observed scatter effects through testing.

The described procedures of FIGS. 6–7 were used to design and fabricate a prototype blurring array 32 of lenslets for an otherwise conventional infrared system 20. The array was designed for the mid-infrared waveband of about 3–5 micrometers wavelength, and a silicon substrate was employed. The hexagonal-close-packed array of FIG. 3 was used. In a representative case, the center-to-center spacing of the cells 40 was 583 micrometers, and the corner-to-corner diameter of the cells was 674 micrometers. The mean distance D was 16 micrometers. The design was based on a spherical shape of the lenslets, which shape is most conducive to manufacture by reactive ion etching, and normal (Gaussian) distributions of the radius of curvature $R_C$ and the axial offset $\delta$ with truncation cutoffs at +/– one standard deviation from the mean to ensure that the blurring would not be too large or too small. The resulting mean and standard deviation of the radius of curvature $R_C$ were, respectively, 17038 micrometers and 11355 micrometers. The resulting mean and standard deviation of the axial displacement $\delta$ (calculated relative to the distance D of 16 micrometers) were, respectively, 0 and 3 micrometers.

From these distributions, random values were selected for the array of cells 40 that define the blurring array 32. FIGS. 8 and 9 are exemplary excerpts from the array of values selected by this procedure for a lenslet array numbered as in FIG. 3, for the radius of curvature $R_c$ and the axial displacement $\delta$, respectively. Only a portion of the parameters for the full array are shown in these examples, but the full arrays were larger.

Using these distributions, the prototype blurring array 32 was fabricated by photolithography and reactive ion etching.

The properties of the prototype blurring array 32 were measured. A smooth blurring was achieved, with few artifacts and no interference effects visible. For comparison, a blur film assembly as described in U.S. Pat. No. 5,867,307 was prepared. At comparable levels of blurring, it was found that the scene energy lost in the image reaching the detector 28 was about 18 percent of the scene energy for the blur-film assembly made by the '307 patent, while the scene energy lost in the image reaching the detector 28 for the blurring array 32 of the present invention was about 5 percent. That is, the energy loss for the present approach was less than ⅓ that of the approach of the '307 patent. This result is highly significant, because the present blurring array 32 does not excessively change the image intensity between the blurred and the unblurred images, and because the present approach allows fainter images to be analyzed for a given optical system and detector.

Figure 10:
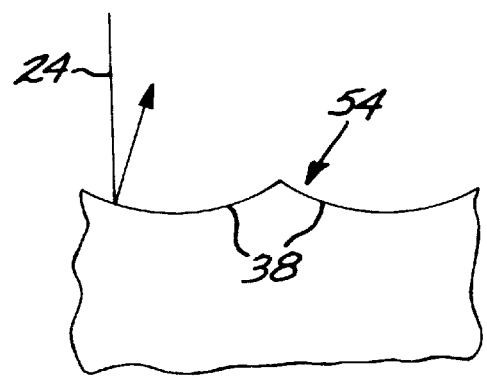
FIG. 10 is a schematic sectional view of two mirrorlets.

The preceding discussion has been directed primarily to the preferred embodiment wherein the blurlet 38 is a refractive lenslet 39. The blurlet 38 may also be a reflective mirrorlet used in an optical system where the blurred light beam is reflected to a detector or other application. FIG. 10 depicts two such mirrorlets 54. The mirrorlets 54 may be made with their surfaces reflective, or with a transparent substrate material providing total internal reflection that accomplishes reflection of the focusing beam 24. In the case of a purely reflective mirrorlet, the material of construction need not be selected for a specific waveband. The appropriate principles discussed above for blurlets, and specifically for lenslets, are equally applicable for mirrorlets with alteration associated with their reflective rather than refractive nature, and are incorporated by reference here.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system comprising
    a blurring array comprising a substrate having thereon a surface array of blurlets, wherein each blurlet has a focus and an optical phase, and wherein at least one of
        the foci of the blurlets, and
        the optical phases of the blurlets at a nominal focal surface location varies in a pseudorandom hut deterministic manner.

2. The optical system of claim 1, wherein both the foci of the blurlets and the optical phases of the blurlets at the nominal focal surface location vary . in the pseudorandom but deterministic manner.

3. The optical system of claim 1, wherein the substrate is made of a material transmissive to a waveband of incident optical energy.

4. The optical system of claim 1, wherein the blurlets are lenslets that refract incident optical energy.

5. The optical system of claim 1, wherein the blurlets are mirrorlets that reflect incident optical energy.

6. The optical system of claim 1, wherein the optical system further includes
    a detector lying at about the nominal focal surface location, and
    an optics system that focuses optical energy from a scene onto the detector.

7. The optical system of claim 6, wherein the detector is an infrared detector.

8. The optical system of claim 1, wherein the foci of the blurlets are at locations relative to the nominal focal surface location that are randomly selected from a set of values defined by a truncated distribution.

9. The optical system of claim 1, wherein the blurlets are surfaces each defined by a curvature and an axial offset, and wherein at least one of the curvature and the axial offset of each blurlet is a value that is randomly selected from a set of values defined by a respective truncated distribution.

10. The optical system of claim 1, wherein the blurlets are surfaces each defined by a curvature and an axial offset, and wherein both the curvature and the axial offset of each blurlet is a value that is randomly selected from a set of values defined by a respective truncated distribution.

11. The optical system of claim 1, wherein the optical phases of the blurlets at the nominal focal surface location are randomly selected from a set of values defined by a truncated distribution.

12. An optical system comprising
    a blurring array comprising a substrate having thereon a surface array of blurlets, wherein the blurlets are surfaces each defined by a curvature and an axial offset from a nominal focal surface location, and wherein at least one of the curvature and the axial offset of each blurlet is a value that is randomly selected from a set of values defined by a respective distribution.

13. The optical system of claim 12, wherein the substrate is made of a material transmissive to a waveband of incident optical energy.

14. The optical system of claim 12, wherein the blurlets are lenslets that refract incident optical energy.

15. The optical system of claim 12, wherein the blurlets are mirrorlets that reflect incident optical energy.

16. The optical system of claim 12, wherein the optical system further includes
    a detector lying at about the nominal focal surface location, and
    an optical system that focuses optical energy from a scene onto the detector.

17. The optical system of claim 16, wherein the detector is an infrared detector.

18. The optical system of claim 12, wherein the respective distributions are each truncated distributions.

19. The optical system of claim 12, wherein both the curvature and the axial offset of each blurlet is a value that is randomly selected from a set of values defined by a respective distribution.

20. The optical system of claim 12, wherein both the curvature and the axial offset of each blurlet is a value that is randomly selected from a set of values defined by a respective truncated distribution.

* * * * *